United States Patent [19]

Unno et al.

[11] Patent Number: 4,689,539
[45] Date of Patent: Aug. 25, 1987

[54] SPEED DETECTING DEVICE

[75] Inventors: Mahito Unno; Katsuhiro Yamamoto, both of Aichi, Japan

[73] Assignee: Mitsubishi Denki Kabushiki Kaisha, Tokyo, Japan

[21] Appl. No.: 939,303

[22] Filed: Dec. 5, 1986

Related U.S. Application Data

[63] Continuation of Ser. No. 638,138, Aug. 6, 1984.

[30] Foreign Application Priority Data

Aug. 10, 1983 [JP] Japan .................... 58-146232

[51] Int. Cl.⁴ ............................ G05B 11/18
[52] U.S. Cl. .................... 318/594; 318/653; 318/616
[58] Field of Search ............ 318/594, 592, 590, 563, 318/653, 561, 615, 616, 618; 364/182

[56] References Cited

U.S. PATENT DOCUMENTS

| | | | |
|---|---|---|---|
| 3,906,326 | 9/1975 | Chur | 318/594 |
| 4,006,394 | 2/1977 | Cuda | 318/594 X |
| 4,258,301 | 3/1981 | Kawa | 318/594 |
| 4,272,710 | 6/1981 | Duill et al. | 318/470 |
| 4,403,181 | 9/1983 | Kohzai | 318/592 X |
| 4,491,776 | 1/1985 | Veale | 318/561 |
| 4,503,374 | 3/1985 | Sakano | 318/561 X |

FOREIGN PATENT DOCUMENTS 0032301 12/1980 European Pat. Off. .
2823140 5/1978 Fed. Rep. of Germany .

OTHER PUBLICATIONS

IBM Technical Disclosure Bulletin, vol. 21, No. 8, Jan. 1979, N. K. Arter et al.

Primary Examiner—William M. Shoop, Jr.
Assistant Examiner—Patrick C. Keane
Attorney, Agent, or Firm—Sughrue, Mion, Zinn, Macpeak & Seas

[57] ABSTRACT

A speed detecting device for an electric motor in which the angular stopping position of a rotary shaft is controlled with a high precision. A magnet is mounted on a rotary shaft of the motor, and a position detector detects the position of the magnet as rotated by the motor, thereby producing an output signal having a linear region. A speed calculator samples this signal in the liner region at predetermined time intervals and performs a division operation whereby a difference between a present sampled value and a preceding sampled value of the output signal is divided by the time interval, thereby to produce a speed signal which is applied to the motor as a control signal.

6 Claims, 6 Drawing Figures

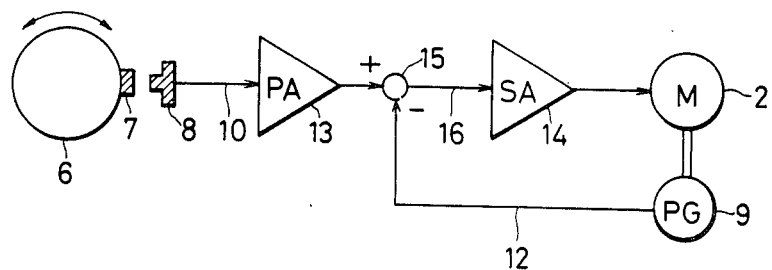
FIG. 2
PRIOR ART
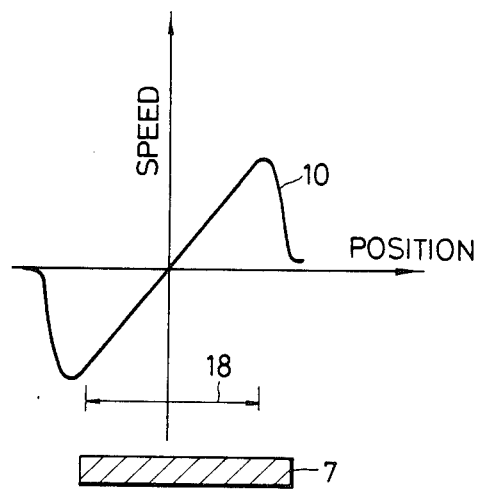
FIG. 3
PRIOR ART
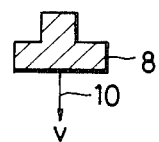

PULSE ENCODER OUTPUT 12 (HIGH SPEED)

(A) PULSE ENCODER OUTPUT 12 (LOW SPEED)

(B) PULSE ENCODER OUTPUT 12 (LOW SPEED)

SPEED DETECTING DEVICE

This is a continuation of application Ser. No. 638,138 filed Aug. 6, 1984.

BACKGROUND OF THE INVENTION

The present invention relates to a speed detecting device for an apparatus used, for instance, to stop the rotary shaft of a machine tool such as a punch or lathe at a predetermined position.

FIG. 1 shows the basic construction of a conventional stopping device. In FIG. 1, reference numeral 1 designates a control unit; 2, an electric motor; 3, a motor shaft; 4 and 5, gears; 6, a rotary shaft which is to be stopped at a predetermined rotary position thereof; 7, a magnet mounted on the rotary shaft 6; 8, a position detector implemented with a magnetic detector; 9, a pulse encoder for producing a speed signal 12; 10, an output signal provided by the position detector; and 11, a three-phase cable.

The operation of the conventional device is as follows: The control unit 1 applies a command to the motor 2 to cause it to selectively rotate the motor shaft 3 so that the rotary shaft 6 is rotated or stopped at a predetermined position through the gears 4 and 5. The position of the rotary shaft is detected by the position detector 8 by detecting the position of the magnet 7 on the rotary shaft 6. The output signal 10 of the position detector 10 is fed back to the control unit 1.

FIG. 2 is a block diagram showing a control system for the conventional stopping device. In FIG. 2, reference numeral 13 designates a position control amplifier; 14, a speed control amplifier; 15, an adder; and 16, a speed command.

In a device using an induction motor as the above-described electric motor, speed control is carried out as follows: A speed control device for reducing the speed to zero at the designated point is used in the stopping operation. More specifically, as shown in FIG. 2, the difference between the speed signal 12 outputted by the pulse encoder 9 and the output signal 10 of the position detector 8 as indicated in a graph in FIG. 3 and which is a target speed value v is calculated to obtain a speed command 16. The speed is then zeroed so as to cause the shaft to stop at the aimed point.

In the speed control device, speed control must be performed with high precision, especially when the shaft is near the designated stopping point, and therefore it is essential to obtain an accurate speed signal from the motor shaft. In the conventional device, the speed control system is constructed using the pulse encoder 9 as a detector for obtaining the speed signal. Calculation of the speed with the pulse encoder 9 can be achieved by counting pulses per unit time as illustrated in FIG. 4. When, with a pulse encoder generating $N_0$ pulses per revolution, n pulses are counted in a period of time T, the speed is represented by $(1/N_0) \cdot (n/T)$. In this calculation, the resolution of speed detection is $(1/N_0) \cdot (n/T)$ per pulse, and as indicated by waveform (A) and (B) in FIG. 4 which show pulse encoder output signals during low speed operation, an error of one pulse is caused by the difference of sampling times. Thus, the conventional device is disadvantageous in that the error is large in the range of speed which is beyond the resolution of speed detection, and the accuracy of speed control is low in the range of low speeds typically involved in stopping operations. In order to eliminate these difficulties, the number N of pulses per revolution produced by the pulse encoder 9 may be increased thereby to increase the resolution of speed detection. However, this approach is disadvantageous in that the device becomes expensive because a precision pulse encoder must be used, and in order to count pulses without an overflow during high speed operation, the number of places in the counter must be increased, with the result that the control circuit is made more intricate and expensive.

SUMMARY OF THE INVENTION

Overcoming these disadvantages, the invention provides a speed detecting device for a rotary shaft stopping device, in which when the angular position of the rotary shaft approaches the aimed position where its speed should be controlled with high precision, that is, when the linear part of the output signal of the position detector is detected, the speed is detected from the signal to obtain an accurate speed signal, thereby to stop the rotary shaft at a predetermined position with high accuracy.

BRIEF DESCRIPTION OF THE DRAWINGS

FIG. 2 is a block diagram showing a control system in the conventional stopping device;

FIG. 3 is a graphical representation showing the characteristic of an output signal of a position detector;

DESCRIPTION OF THE PREFERRED EMBODIMENTS

Figure 5:
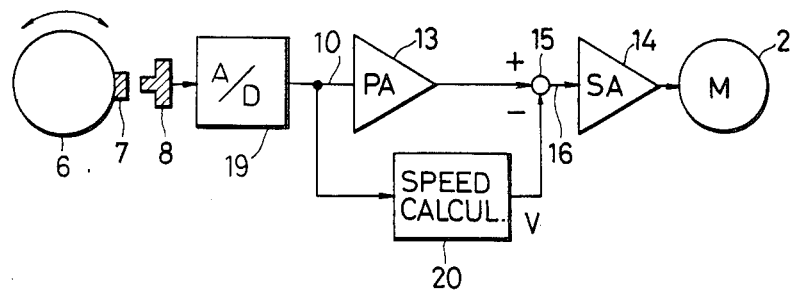
FIG. 5 is a block diagram showing a preferred embodiment of the invention.

FIG. 5 is a block diagram showing a speed detecting device constructed in accordance with the invention.

FIG. 5, reference numeral 19 designates an A/D (analog-to-digital) converter, and 20 a speed calculator such as a microprocessor Intel 8086. Other elements are the same as those in FIGS. 1 and 2.

The operation of this embodiment will be described with reference to FIG. 5.

Figure 6:
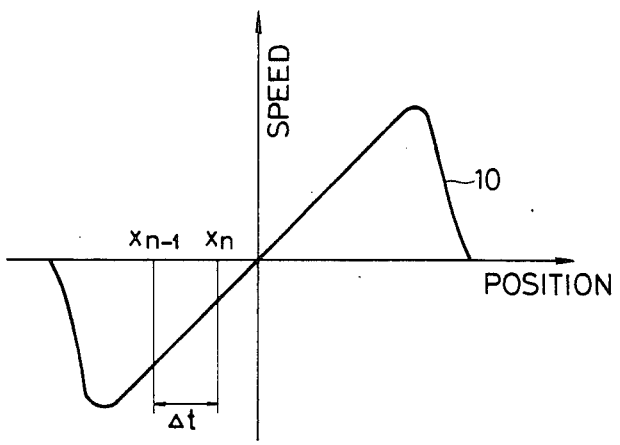
FIG. 6 is a graphical representation indicating the characteristic of the output signal of a position detector in the preferred embodiment and showing the speed calculating principle of the invention.

When the rotary shaft is near the aimed position where it is to be stopped, the position detector 8 senses the magnet 7 and outputs the position detection signal 10. The output signal 10 has a characteristic as shown in FIG. 3 or 6. The position detector 8 operates not only to produce the position detection signal 10 but also to produce a high level signal when the linear region of the characteristic curve has been reached. Upon detection of the high level signal the analog value of the signal is converted into a digital value by the A/D converter 19 and the speed calculator 20 determines the fact that the linear region 18 of the output signal 10 is reached. This digital position signal is originally used as a speed target value v. However, since the linear region 18 of the signal 10 is used, the digital position signal is proportional to the position of the magnet 7, that is, the position of the rotary shaft. In the speed calculator 20, position signals obtained in a sampling period of time T are employed. That is, the difference $X_n - X_{n-1}$ between the position signal $X_{n-1}$ of the preceding sampling time is divided by the sampling period of time T. Thus, the speed V for every sampling time is obtained according to the following expression:

$$V = \frac{K_L(X_n - X_{n-1})}{T}.$$

where $K_L$ is a proportional constant

The difference between the speed V and the output signal 10 of the position detector is obtained as a speed command 16 which is applied to the electric motor 2.

Figure 1:
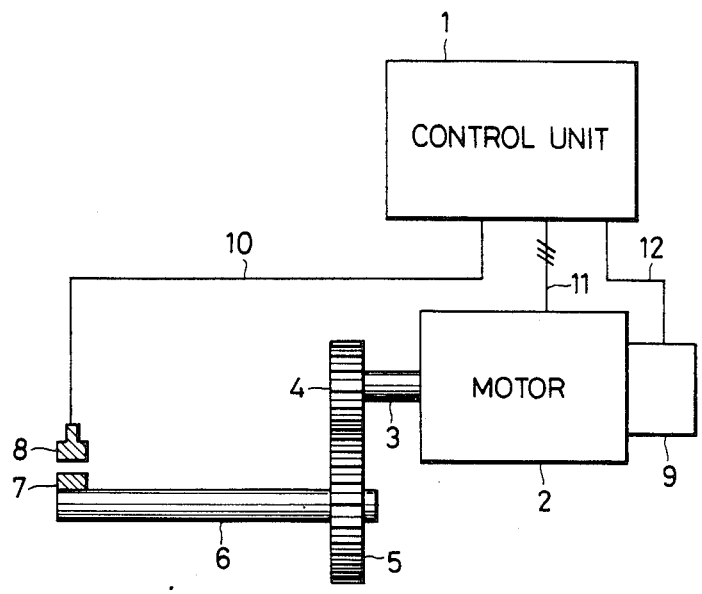
FIG. 1 is an explanatory diagram showing the fundamental arrangement of a conventional rotary shaft stopping device with a speed detecting device.
Figure 4:
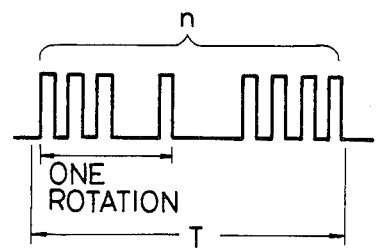
FIG. 4 is a timing chart showing output signals of a pulse encoder which are speed detection signals.
Figure 4:
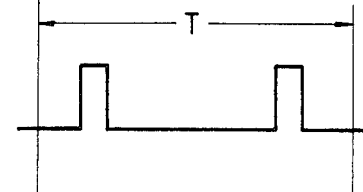
Figure 4:
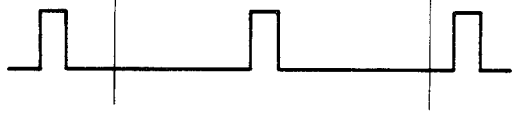

The above-described embodiment may be modified as follows: In addition to the speed detecting device shown in FIG. 5, a second speed detecting device using the pulse encoder 9 as shown in FIGS. 1 and 2 is provided, the speed detection signal of the second speed detecting device is used during the ordinary operation of the electric motor, and in the stopping operation, an automatic switch or a manual switch is operated to use the speed detection signal of the speed detecting device shown in FIG. 5.

If the second speed detecting device is modified so that, during the ordinary operation of the electric motor, the position detector 8 produces one pulse per revolution of the rotary shaft and the pulses thus produced are utilized to detect the speed, in the stopping operation, the device may be switched over to the speed detecting device of FIG. 5 by an automatic or manual switch. Furthermore, instead of the A/D converter, a speed calculator adapted to perform analog calculation by directly sampling the output signal 10 of the position detector, which is an analog signal, may be employed.

The speed detecting device according to the invention is considerably high in operating accuracy, compared with the conventional device, when the rotary shaft is rotating at a low speed immediately before stopping. Accordingly, the positional stopping accuracy is also high. Furthermore, the device is simple in construction and low in manufacturing cost because it is unnecessary to provide a precision pulse encoder.

We claim:

1. A speed detecting device for an electric motor, comprising:

a magnet (7) mounted on a rotary shaft of said motor;

a position detector (8) for detecting said magnet when rotated by said rotary shaft to produce an output signal having a linear region;

a speed detector comprising a pulse encoder (9) for producing a first speed signal proportional to the number of motor revolutions n/No per predefined period of time T, where:

n = number of pulses counted by said encoder over said time period T;

No = number of pulses per motor revolution;

a speed calculator (20) for sampling said output signal in said linear region at integer multiples of a predetermined time interval and performing a division in which a difference between a present sampled value and a preceding sampled value of said signal is divided by said time interval to produce a second speed signal;

switch means for selectively applying either said first speed signal or said second speed signal to said motor, said switch means applying said first speed signal to said motor during the operation of said motor other than during a stopping operation thereof and applying said second speed signal to said motor during a stopping operation of the motor;

whereby said rotary shaft of the motor can be positioned with high accuracy during the stopping operation.

2. The device as claimed in claim 1, wherein said linear region corresponds to a range of low speed.

3. The device as claimed in claim 1, further comprising an analog-to-digital converter, said output signal produced by said position detector being applied through said analog-to-digital converter to said speed calculator, said speed calculator operating in a digital mode.

4. A speed detecting device for an electric motor, comprising:

a magnet (7) mounted on a rotary shaft of said motor;

a position detector (8) for detecting said magnet when rotated by said rotary shaft to produce an output signal having a linear region;

a speed detector comprising a pulse encoder (9) means for producing a first speed signal by counting the number of pulses produced by said encoder over a predefined time period T, there being a predetermined number of pulses per revolution of the motor;

a speed calculator (20) for sampling said output signal in said linear region at integer multiples of a predetermined time interval and performing a division in which a difference between a present sampled value and a preceding sampled value of said signal is divided by said time interval to produce a second speed signal;

an adder (15) for obtaining a difference between one of said first and second speed signals and said output signal produced by said position detector and applying said difference thus obtained as a speed command to said motor; and switch means for selectively applying either said first speed signal or said second speed signal to said adder, said switch means applying said first speed signal to said adder during operation of said motor when said motor is other than in a stopping operation and applying said second speed signal to said adder during the stopping operation of the motor.

5. The device as claimed in claim 4, further comprising a position control amplifier, said output signal produced by said position detector being applied through said position control amplifier to said adder.

6. The device as claimed in claim 5, wherein an output of said adder is applied through said speed control amplifier to said motor.

* * * * *